United States Patent [19]

Lundgren et al.

[11] 4,119,473

[45] Oct. 10, 1978

[54] REFRACTORY COMPOSITION FOR USE IN METALLURGICAL FURNACES

[75] Inventors: Bert Karl Gustaf Lundgren, Nynäshamn; Gunnar Thaning, Täby, both of Sweden

[73] Assignee: Strabruken AB, Stockholm, Sweden

[21] Appl. No.: 791,115

[22] Filed: Apr. 26, 1977

[30] Foreign Application Priority Data

May 3, 1976 [SE] Sweden .................................. 7605031

[51] Int. Cl.$^2$ ....................... C04B 35/04; C04B 35/06
[52] U.S. Cl. ........................................... 106/58; 106/63
[58] Field of Search .............................. 106/56, 58, 63

[56] References Cited

U.S. PATENT DOCUMENTS

| | | | |
|---|---|---|---|
| 2,500,208 | 3/1950 | Shea et al. ................................ | 106/56 |
| 3,256,104 | 6/1966 | Weaver .................................... | 106/56 |
| 3,350,295 | 10/1967 | Hamner et al. ......................... | 106/56 |
| 3,969,124 | 7/1976 | Stewart ................................... | 106/56 |

*Primary Examiner*—J. Poer
*Attorney, Agent, or Firm*—Fred Philpitt

[57] ABSTRACT

The present invention is concerned with a composition for metallurgical furnaces.

The composition comprises one or more refractory materials and an aromatic substance in which the atomic ratio of carbon to hydrogen is approximately 0.8 or higher. That substance serves as a binder for the refractory material. The composition of the invention is characterized in that the aromatic substance presents an average molecular weight of approximately 1500 or higher and an initial boiling point of approximately 300° C or higher at 760 mm Hg.

6 Claims, No Drawings

REFRACTORY COMPOSITION FOR USE IN METALLURGICAL FURNACES

The present invention relates to a refractory composition for use in metallurgical furnaces as a tamping or fettling material or, subsequent to being pressed and/or vibrated, as a brick material, said refractory composition comprising one or more refractory materials and an aromatic substance in which the atomic ratio of carbon to hydrogen is approximately 0.8 or higher.

Bricks, tamping and fettling materials having the above definition are previously known. The bricks are built into the metallurgical furnace to form a refractory furnace lining. Tamping materials are used for the bottom lining of the furnace, while fettling materials are intended to be used for repairing the furnace linings. Hitherto, the binder used in such refractory compositions has been, practically without exception, a mixture of coal-tar and coal-tar pitch having the aforementioned characteristics. The binding agent content is normally approximately 6%, although may vary somewhat, especially downwardly, but is seldom in excess of 7%, since bricks made from such a composition would swell when heated in the furnace, with subsequent disadvantages.

A further disadvantage with such a refractory composition is that it contains relatively high percentages of substances, e.g. carcinogenic polynuclear aromatic hydrocarbons, such as benz-a-pyrene, which is alleged to promote cancer upon contact with the skin and, when heated, by inhaling harmful vapours. The reason why coal-tar pitch contains such high contents of these harmful substances is that these substances are formed by the pyrolysis of a carbonaceous material, e.g. by a process involving the heating of organic material at relatively high temperatures. The mixture of coal-tar pitch and coal-tar also contains relatively volatile components which imparts to the burned brick, subsequent to the carbon having been burned therefrom, an excessively high porosity and a low residual carbon content, whereby the brick wears more readily when attacked by slag.

It has now been discovered that the aforementioned disadvantages can be eliminated, or at least greatly reduced, by using a binder in the aforementioned mixing ratio, having an average molecular weight ($\overline{M}_n$) exceeding approximately 1500 and an initial boiling point of at least approximately 300° C. at 760 mm Hg. The average molecular weight ($\overline{M}_n$) (number-average molecular weight) is calculated with the aid of the formula $$\overline{M}_n = \Sigma M_i n_i / \Sigma n_i$$

in which $i$ is an integer between 1 and $\infty$ and $n_i$ is the number of molecules having the molecular weight $M_i$.

In accordance with an important embodiment of the invention, the aromatic substance used as a binding agent may be a resin product obtained by the oxidative polymerisation, with or without a catalyst, of a mineral oil distillate and/or a solvent extract of mineral oil distillate having a content of aromatically bound carbon corresponding to a VGC-value according to ASTM of at least 0.85 and having an average molecular weight of 150 – 600, said resin product having an initial boiling point of approximately 300° C. or higher at 760 mm Hg. The manufacture of such products is described more in detail in U.S. patent application Ser. No. 629,463 which in appropriate respects is considered to form part of the present description.

A process for the preparation of these products from mineral oil distillates or from solvent extracts of such distillates disclosed in said U.S. application comprises oxidizing one or more mineral oil distillates and/or solvent extracts of mineral oil distillates having a content of aromatically bound carbon corresponding to a VGC-value of at least 0.85, preferably at least 0.90, and an average molecular weight of 150 to 600, preferably 200 to 500, by blowing oxygen, preferably in the form of air, thereinto and fractionating the oxidized distillate and/or extract, at least one product fraction having a boiling point interval in the temperature range of from about 320° C. to about 420° C. at 760 mm Hg and another product fraction having a lowest boiling temperature of 400° C. or above at 760 mm Hg being isolated in the fractionation and products obtained by this process.

A product fraction comprising a light oil which possesses extremely valuable properties as regards stability to oxidation and which can be used as a process oil can be obtained by oxidation of one or more mineral oil distillates and/or solvent extracts from mineral oil distillates having a certain minimum content of aromatically bound carbon by blowing air thereinto and subsequent distillation of the oxidized distillate and/or extract and collection of certain product fractions at temperatures of up to about 375° C. at 760 mm Hg.

The different product fractions which may be obtained can thus extend over the whole temperature range of 320° to 420° C. or over a narrower range within this range. If a lower flash point or a darker colour of the first product fraction is considered to be tolerable it is possible to allow the boiling temperature of a minor part of the fraction to lie a little below 320° C. at 760 mm Hg, for instance down to about 315° C., and/or a little above 420° C. at 760 mm Hg. Similarly, minor amounts of components boiling at temperatures a little below 400° C. at 760 mm Hg can be allowed to be present in the second product fraction if the stickiness of the product caused thereby is considered to be tolerable.

The different product fractions may be collected in separate steps each of which is preceded by an oxidation step. The second product fraction can, for instance, be recovered by subjecting the bottom fraction remaining after distilling of the first product fraction to oxidation by blowing air thereinto whereafter components having a boiling point lower than the boiling point range of the desired fraction are removed by distillation or stripping.

Part of the substances leaving the distillate and/or the extract with the oxidation gases in an oxidation step may be condensed and fed back into the process.

The oxidation may be carried out in the presence of a catalyst, which is soluble in the oxidized distillate and/or extract or is converted into compounds which are soluble in the oxidized distillate and/or extract by reaction with the distillate and/or extract. The product fraction having a lowest boiling temperature of 400° C. or above will in this way be given a higher penetration at equal softening point, which in practice means a decrease in the shortness of this product.

The catalyst may, for instance, be a metal organic salt, a metal oxide or a mixture thereof, the catalyst preferably being used in an amount corresponding to 0.01 to 2% by weight of metal calculated on the distillate or extract to be oxidized. The product fraction having a lowest boiling temperature of 400° C. or above may as a consequence thereof contain from about 0.01 to about 3% by weight of metal, calculated on the weight of said fraction.

Any metal known to function as a catalyst by continuous variation of its valency between two oxidation states may be used. Examples of such metals are chromium, cobalt, nickel, iron, copper, and manganese. In addition, zinc has proved to function excellently as catalyst metal in accordance with the invention.

The metal organic salts may, for instance, be naphthenates or salts of aliphatic carboxylic acids. The organic part of the salt is preferably as small as possible, Naphthenates, acetates, propionates and butyrates are especially preferred salts.

Irrespectively of whether the catalyst is added in the form of an oxide or a metal organic compound the metal will be present in the same final form in the residue after the distillation.

The oxidation may be carried out in the presence as well as in the absence of a catalyst for a period of at least 7 hours in order to obtain a softening point of the residue after distillation of at least 100° C., preferably within the range of from 105° to 140° C. Products having a softening point above 140° C. cannot easily be brought in a particulate form by spray cooling but will have to be brought into said form by grinding.

The product fraction boiling at 375° to 400° C. can be collected in a separate distillation step, but may also be collected from the same distillation column as either of the two other fractions. In principle it is of course possible to collect all three product fractions from one and the same column but, as mentioned above, the product fractions are preferably collected in separate steps, each of which is preceded by an oxidation step.

Each oxidation step may, if desired, be divided into several sub-steps. Such a division may especially be contemplated for the strong first oxidation step.

The oxidation is suitably carried out at a temperature of from 180° to 300° C. at 760 mm Hg.

The hot second product fraction coming from the process may be spray cooled to yield a preferred form of product which may be handled particularly easily.

Any fraction obtained by distillation of a mineral oil and having a content of aromatically bound carbon corresponding to a VGC-value of at least 0.85, preferably at least 0.90, and an average molecular weight of 150 to 600, preferably 200 to 500, may be used as a mineral oil distillate to serve as the starting material in the process according to the invention. Lubricating oil distillates having a boiling point interval of 250° to 295° C., 295° to 340° C., 340° to 385° C., 385° to 440° C. or 440° to 490° C., corresponding to an average molecular weight of about 210, 250, 295, 350, and 425, respectively, are examples of such fractions.

The term "solvent extracts of mineral oil distillates" is used herein to designate products obtained in any suitable way by extraction of mineral oil distillates with, for example, furfural, cresol, phenol, or liquid $SO_2$. In order to be suitable for use in the process of the invention the extracts should have a content of aromatically bound carbon and an average molecular weight in accordance with what has been stated for the mineral oil distillates above.

The VGC-value (VGC = Viscosity Gravity Constant) is a standard measure for the aromatic contents of mineral oil products and is determined according to ASTM D 2140. A VGC-value of 0.85 generally corresponds to a content of aromatically bound carbon of about 10 to 30%, while a VGC-value of 0.90 generally corresponds to an aromatic carbon content of about 25 to 40%, calculated on the total amount of carbon.

The proportions obtained of the different fractions can be adjusted by proper choice of the oxidation time and of the average molecular weight of the starting material.

In accordance with a preferred embodiment of the present invention, the resin product may have an initial boiling point of approximately 400° C. or higher at 760 mm Hg.

Products which fulfill the requirements as a binder in the refractory composition according to the invention are also oxidized asphalts, propane asphalt, i.e. asphalt obtained by treating thick residual oils with propane, oxidatively polymerised, so-called cracker tars from the petroleum industry. Cracker tars are obtained as residual products when vapour-cracking naphtha and gas oil are subjected to oxidative polymerisation at 200°-300° C. in order to be usalbe for the present purpose.

In accordance with one embodiment of the invention the mixture of refractory material and aromatic substance, in addition to the aforementioned components, may also contain solvents and/or plasticizers so as to obtain a lower viscosisty or to modify the characteristics of the mixture, for example for the purpose of improving the spreading characteristics of the mixture and to increase the adhesiveness of the binder over the whole of the surface of the refractory material. To this end the composition may contain mineral oil distillate and/or extracts of a mineral oil distillate as a plasticizer for the binding agent having an average molecular weight of 150 – 600. In this respect, the aromatic substance intended to serve as the binding agent constitutes a part in a binding agent composition, which, in addition to the binding agent, contains one or more mineral oil distillates and/or extracts of mineral oil distillate as a plasticizer for the aromatic substance. The content of solvent and/or plasticizer may vary greatly. In general it can be said that additions of up to approximately 50% calculated on the weight of the binding agent composition are sufficient in the majority of cases.

The refractory material may be most types of inorganic materials used for this purpose, primarily calcined dolomite and calcined magnesite or mixtures thereof.

The present invention enables the use of refractory materials containing relatively high quantities of substances previously considered as impurities in the present context, such as iron oxides and aluminium oxides. The quantity of such impurities, the presence of which causes the melting point of the refractory composition to decrease and thus result in disturbances during the burning of the refractory composition, may be approximately 5% in the case of iron calculated as $Fe_2O_3$. When used in combination with such refractory materials as Scandinavian dolomite and magnesite, the present binding agent subsequent to burning, provides a product which is at least equally as suitable as a product obtained from a purer starting material containing previously known binding agents based on coal-tar. It is therefore logical to assume in connection herewith that the present binding agent when used in combination with purer refractory material would result in properties concerning quality and environment aspects not previously possible to achieve.

The refractory composition according to the invention is most simply produced by simply mixing the components in the absence of a plasticizer, preferably whilst mechanically working the mix, e.g. in a mixing machine. It may be an advantage to add solvent and/or plasticizer in conjunction with the mixing operation. It is also conceivable, and sometimes even advantageous, to first mix the refractory material with the binder and then to add solvent and/or plasticizer. It is also possible first to dissolve the binder in the solvent and/or plasticizer and to mix the solution thus obtained with the refractory material.

The invention will now be described with reference to a number of examples.

EXAMPLE 1

In the manufacture of dolomite bricks, 100 kg of burned dolomite having a normal particle-size distribution for refractory brick material were mixed with 6 kg of a binding agent consisting of a petroleum resin in a suitable mixer under dry conditions at room temperature. The petroleum resin had an atomic carbon/hydrogen ratio of 0.9 and a softening point (ring and ball method) of 138° C., a penetration (1/10 mm, 25° C.) of 1, an average molecular weight ($\overline{M}_n$) of 7,300 and an initial boiling point of 400° C. at 760 mm Hg.

The petroleum resin was obtained by the oxidative polymerisation of a mineral oil extract having a VGC-value of 0.96 and a viscosity of 17.0 cSt at 100° C., by air injection (1 liter/kg/min), the water being split-off.

The mixture of burned dolomite and petroleum resin was heated to approximately 175° C. and charged to a mould and pressed to brick-shape at approximately 175° C. at a pressure of 1000 kp/cm².

The brick thus obtained exhibited the following characteristics when subjected to tests:
compression strength kp/cm² after burning 42.5 hours at 1500° C.: $\overline{m}_3$ 298
slag attack mm/h: $\overline{m}_3$ 5.1

$\overline{m}$ is the average number of determinations made and the index number at $\overline{m}$ the number of determinations.

EXAMPLE 2

The test described in Example 1 was repeated with the exception that mixing in the mixing apparatus now took place with an addition of 6% of a binding agent-composition containing 44% of a plasticizer and 56% of the resin described in Example 1. The plasticizer was a naphthenic mineral oil extract having an average molecular weight of 310 and a viscosity at 100° C. of 5.5 cSt. A satisfactorily mixed product was obtained at 90° C. after a period of 3 – 5 minutes.

The mix was pressed in the manner described in Example 1.

When subjected to tests, the bricks exhibited the following characteristics:
Compression strength kp/cm² after burning for 5 hours at 1500° C.: $\overline{m}_3$ 749
slag attack mm/h: $\overline{m}_1$ 3.7.

EXAMPLE 3

The test in Example 1 was repeated but with the exception that mixing in the mixing apparatus took place with an addition of 6% of a binding agent consisting of oxidised asphalt. A satisfactorily mixed product was obtained at 175° C. after a period of 3 – 5 minutes.

The mixture was pressed in the manner disclosed in Example 1.

When subjected to tests the brick thus obtained exhibited the following characteristics:

Compression strength kp/cm² after burning for 2.5 hours at 1500° C.: $\overline{m}_3$ 343
slag attack mm/h: $\overline{m}_1$ 6.0

EXAMPLE 4

By way of a comparison test, the test described in Example 1 was repeated but with the exception that the mixing in the mixing apparatus took place with an addition of 6% of a mixture of coal-tar pitch and coal-tar. A satisfactorily mixed product was obtained at 90° C. over a period of 3 – 5 minutes.

The mixture was pressed in a manner similar to that described in Example 1.

When tested the brick thus obtained exhibited the following characteristics:
Compression strength kp/cm² after burning for 2.5 hours at 1500° C.: $\overline{m}_3$ 275
compression strength kp/cm² after burning for 5 hours at 1500° C.: $\overline{m}_3$ 539
slag attack mm/h: $\overline{m}_6$ 13.9.

What we claim is:

1. In the known refractory composition that comprises
   (1) at least one refractory material selected from the group consisting of burned dolomite, burned magnesite, and mixtures thereof, and
   (2) a binder admixed with the refractory material so that the refractory material can be formed into the desired shape. the improvement which comprises utilizing as said binder an aromatic substance
      (a) having an atomic ratio of carbon to hydrogen of at least 0.8,
      (b) having an average molecular weight ($\overline{M}_n$) of at least 1500,
      (c) having an initial boiling point of at least 300° C. at 760 mmHg,
      (d) that is selected from the group consisting of resin products obtained by the oxidative polymerization of a mineral oil distillate and solvent extracts from a mineral oil distillate with a content of aromatically bound carbon corresponding to a VGC-value of at least 0.85 and having an average molecular weight of 150 – 600, said polymerization being effected with or without a catalyst while splitting-off water.

2. A refractory composition according to claim 1 wherein said resin product has an initial boiling point of at least 400° C. at 760 mm Hg.

3. A refractory composition according to claim 1 wherein the aromatic substance serving as binding agent is a constituent of a binder composition which also includes at least one member selected from the group consisting of mineral oil distillates and extracts of a mineral oil distillate, as a plasticizer for the aromatic substance.

4. A refractory composition according to claim 3, wherein said member has a content of aromatically bound carbon corresponding to a VGC-value of at least 0.85 and an average molecular weight of 150 – 600.

5. A refractory composition according to claim 3, wherein the content of plasticizer in the binder composition amounts to approximately 50% or less calculated on the weight of the binder composition.

6. A brick material for metallurgical furnaces consisting of a pressed or vibrated refractory composition as set forth in claim 1.

* * * * *